US012600413B2

(12) United States Patent
Anasenzl et al.

(10) Patent No.: US 12,600,413 B2
(45) Date of Patent: Apr. 14, 2026

(54) STORAGE HOUSING FOR AN ENERGY STORE OF A MOTOR VEHICLE

(71) Applicant: Bayerische Motoren Werke Aktiengesellschaft, Munich (DE)

(72) Inventors: Manuel Anasenzl, Mainburg (DE); Ahmed El-Sawy, Munich (DE); Manuel Schurz, Landshut (DE); Marcel Sterzenbach, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 18/036,690

(22) PCT Filed: Nov. 30, 2021

(86) PCT No.: PCT/EP2021/083571
§ 371 (c)(1),
(2) Date: May 12, 2023

(87) PCT Pub. No.: WO2022/122475
PCT Pub. Date: Jun. 16, 2022

(65) Prior Publication Data
US 2023/0415818 A1 Dec. 28, 2023

(30) Foreign Application Priority Data
Dec. 11, 2020 (DE) ..................... 10 2020 133 182.7

(51) Int. Cl.
*B62D 21/15* (2006.01)
*H01M 50/242* (2021.01)
*H01M 50/249* (2021.01)

(52) U.S. Cl.
CPC ........ *B62D 21/157* (2013.01); *H01M 50/242* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2012/0223113 A1* | 9/2012 | Gaisne | ................ | H01M 50/249 |
| | | | | 224/538 |
| 2015/0255764 A1* | 9/2015 | Loo | ..................... | H01M 50/249 |
| | | | | 429/149 |

(Continued)

FOREIGN PATENT DOCUMENTS

| | | |
|---|---|---|
| CN | 204368287 U | 6/2015 |
| DE | 10 2015 012 257 A1 | 4/2016 |

(Continued)

OTHER PUBLICATIONS

International Search Report (PCT/ISA/210) issued in PCT Application No. PCT/EP2021/083571 dated Mar. 21, 2022 with English translation (six (6) pages).

(Continued)

*Primary Examiner* — Joseph D. Pape
(74) *Attorney, Agent, or Firm* — Crowell & Moring LLP

(57) ABSTRACT

A storage housing for an energy store of a motor vehicle includes at least one housing part along which a longitudinal member is arranged on both vehicle outer sides of the storage housing. The longitudinal member is designed as a chamber profile with hollow chambers delimited by chamber walls. In order in this case to provide a storage housing which, on the one hand, has particularly advantageous accident properties, in particular in the event of a side impact on the motor vehicle, and, on the other hand, can nevertheless be produced relatively favorably, the longitudinal members on both vehicle outer sides of the storage housing are formed from in each case at least two partial longitudinal (Continued)

members, the partial cross sections of which complement one another to form an overall cross section.

12 Claims, 2 Drawing Sheets

(56)                    References Cited

U.S. PATENT DOCUMENTS

| | | | |
|---|---|---|---|
| 2016/0006008 A1* | 1/2016 | Volz ..................... | H01M 50/224 |
| | | | 429/61 |
| 2020/0028137 A1 | 1/2020 | Hirsch et al. | |
| 2021/0146766 A1 | 5/2021 | Haberl et al. | |

FOREIGN PATENT DOCUMENTS

| | | |
|---|---|---|
| DE | 10 2016 115 037 A1 | 2/2018 |
| DE | 10 2017 102 685 A1 | 8/2018 |
| DE | 10 2018 109 296 B3 | 9/2019 |
| DE | 10 2018 206 100 A1 | 10/2019 |
| DE | 10 2018 212 099 A1 | 1/2020 |
| DE | 102018120394 * | 2/2020 |
| DE | 2018 130 503 A1 | 6/2020 |
| DE | 10 2019 104 647 A1 | 8/2020 |
| EP | 2 468 609 A2 | 6/2012 |
| WO | 2013/053433 A1 | 4/2013 |
| WO | WO 2020/094487 A1 | 5/2020 |

OTHER PUBLICATIONS

German-language Written Opinion (PCT/ISA/237) issued in PCT Application No. PCT/EP2021/083571 dated Mar. 21, 2022 (six (6) pages).

German-language Search Report issued in German Application No. 10 2020 133 182.7 dated Jul. 28, 2021 with partial English translation (12 pages).

English translation of Chinese-language Office Action issued in Chinese Application No. 202180070220.X dated Jan. 15, 2026 (7 pages).

* cited by examiner

STORAGE HOUSING FOR AN ENERGY STORE OF A MOTOR VEHICLE

BACKGROUND AND SUMMARY

The invention relates to a storage housing for an energy store of a motor vehicle.

A storage housing of this kind is already known, for example, from EP 2 468 609 A2 and is formed substantially from a housing lower part and a housing upper part within which the energy store is arranged. Respective longitudinal members, which are in the form of chamber profiles with hollow chambers delimited by chamber walls, are arranged on both vehicle sides along the storage housing or the lower housing part.

The longitudinal members serve here in particular for side-on crash support in order to avoid damage to the storage housing. In order to achieve corresponding energy absorption properties accompanied by a moderate increase in the acceleration forces on the vehicle occupants in the event of a side-on impact here, complex measures are required in the design of the respective chamber profile of the longitudinal member. For example, it is desirable for an outer region of the longitudinal member to have a lower energy absorption capacity than an inner region of the longitudinal member, the inner region facing the energy store, in order to achieve the desired properties. However, from a manufacturing point of view it is, for example, extremely difficult to vary the profile and/or the thickness of the chamber profiles and chamber walls without thereby considerably increasing the expenditure on manufacture and the production costs.

The object of the present invention is therefore to provide a storage housing of the kind mentioned at the outset which can be produced in a more cost-effective manner and has particularly advantageous accident properties, in particular in the event of a side-on impact.

According to the invention, this object is achieved by a storage housing having the features of the independent claim. Advantageous refinements of the invention together with expedient developments are specified in the dependent claims.

The storage housing according to the invention comprises at least one housing part, for example a housing lower part, along which—with respect to the installation position of the storage housing in the motor vehicle—a respective longitudinal member is arranged on both vehicle outer sides of the storage housing, the longitudinal member being in the form of a chamber profile with hollow chambers delimited by chamber walls.

In order to provide a storage housing here which firstly has particularly advantageous accident properties, in particular in the event of a side-on impact against the motor vehicle, and secondly can nevertheless be produced in a relatively cost-effective manner, according to the invention the longitudinal members on the two vehicle sides of the storage housing are each formed from at least two partial longitudinal members, the cross sections of which complement one another to form an overall cross section. Accordingly, a longitudinal member, the overall cross section of which is produced by two partial cross sections of correspondingly assembled partial longitudinal members, extends along at least one length region of the storage housing.

Dividing the longitudinal member into at least two partial longitudinal members in this way has the advantage, in particular, that the partial longitudinal members can be individually designed in a simple manner, that is to say, for example, one partial longitudinal member has different wall thicknesses of the chamber walls or different partial cross sections of the respective hollow chambers than the other partial longitudinal member. According to experience, the reason is that the longitudinal member should preferably have chamber walls with a lower wall thickness and/or hollow chambers of larger partial cross section in an outer region averted from the store than in an inner region close to the store. In the case of a side-on impact against the motor vehicle or the storage housing, this advantageously produces a deformation profile which initially results in a large deformation with relatively low absorption forces and subsequently a smaller deformation with high energy absorption forces. As a result, amongst other things, the deceleration acting on the vehicle occupants in the event of a side-on collision can be influenced in a targeted manner by way of lower acceleration forces taking effect at the start than in the further course of the accident scenario.

The particular advantage of dividing the longitudinal member into at least two partial longitudinal members can be seen here as being that the chamber walls and/or partial cross sections of the overall longitudinal member can be varied in a simple manner from a manufacturing point of view by way of, for example, the outer partial longitudinal member having a different thickness of the chamber walls or a different partial cross section of the hollow chambers than the inner partial longitudinal member facing the store. At the same time, the chamber walls and/or hollow chambers within the respective partial longitudinal member can be kept largely constant, this resulting in a considerable simplification from a manufacturing point of view, which is clearly reflected in the manufacturing costs.

Therefore, a longitudinal member of which the energy absorption capacity and the accident properties can be particularly well adapted, specifically to conditions that are favorable from a manufacturing point of view, can be provided overall.

The scope of the invention should be considered to include the possibility that the overall cross section of the respective longitudinal member can also be made up of partial cross sections of more than two partial longitudinal members.

In a further refinement of the invention, it has been shown to be advantageous if the at least one housing part has an edge on the two vehicle sides of the storage housing, the edge being arranged between the two laterally associated partial longitudinal members of the corresponding longitudinal member. In other words, accordingly one partial longitudinal member is arranged within the storage housing and one partial longitudinal member part is arranged outside the storage housing with separation by the edge of the storage housing. An arrangement of the partial longitudinal members in this way allows particularly favorable accident properties of the overall longitudinal member to be achieved.

In this context, it has been shown to be further advantageous if the housing part is in the form of a housing lower part and the edge is bent upward in relation to a bottom of the housing lower part. The edge can therefore be integrated into the longitudinal member in a particularly favorable manner.

In this context, it has also been shown to be further advantageous if an inner chamber wall of the respective outer partial longitudinal member, the edge of the housing part and an outer chamber wall of the respective inner partial longitudinal member form a three-layer assembly which forms a total thickness of, for example, approximately 7 to approximately 10 millimeters in respect of a side-on impact, and as a result of which there is particularly favorable reinforcement in the critical region in the event of a side-on impact, specifically in the region of the edge of the storage housing, and therefore a small deformation when force is applied.

Furthermore, it has been shown to be advantageous if the chamber walls of the respective inner and outer partial longitudinal member and the edge have an at least substantially uniform thickness. This results in a particularly favorable and rigid assembly of the components involved.

A further, advantageous embodiment of the invention makes provision for the respective inner partial longitudinal member to be connected to the bottom of the housing lower part. This results in particularly favorable support of the inner partial longitudinal member on the bottom and therefore also particularly favorable and stable support of the longitudinal member overall.

Furthermore, it has been shown to be advantageous if the respective inner partial longitudinal member has a substantially L-shaped cross section. This results in particularly favorable support of the partial longitudinal member or of the edge of the storage housing at corners, so that the storage housing is of a particularly stable form in its critical edge region.

In a further refinement of the invention, it has additionally been shown to be advantageous if the chamber walls of the respective outer partial longitudinal member and of the respective inner partial longitudinal member are connected to one another with the interposition of the edge—that is to say indirectly. In other words, accordingly firstly the outer partial longitudinal member is connected to the edge and secondly the inner partial longitudinal member is connected to the edge, the two components not being directly connected. As a result, the leak tightness of the storage housing can be ensured in a particularly favorable manner.

A further advantageous embodiment of the invention makes provision for the hollow chambers of the respective inner partial longitudinal member to have a smaller cross section than the hollow chambers of the respective outer partial longitudinal member.

In addition, it has been shown to be advantageous if the partial longitudinal members are formed from a continuous profile, in particular an extruded profile. Continuous profiles or extruded profiles of this kind can be manufactured in a particularly cost-effective manner.

Instead of extruded profiles, rolled profiles or the like would also be conceivable here, for example.

Further features of the invention can be found in the claims, the figures and the description of the figures. The features and combinations of features mentioned above in the description and the features and combinations of features mentioned in the description of the figures below and/or shown solely in the figures can be used not only in the respectively stated combination but also in other combinations or on their own.

The invention will now be explained in more detail using a preferred exemplary embodiment and with reference to the drawings.

DETAILED DESCRIPTION OF THE DRAWINGS

Figure 1:
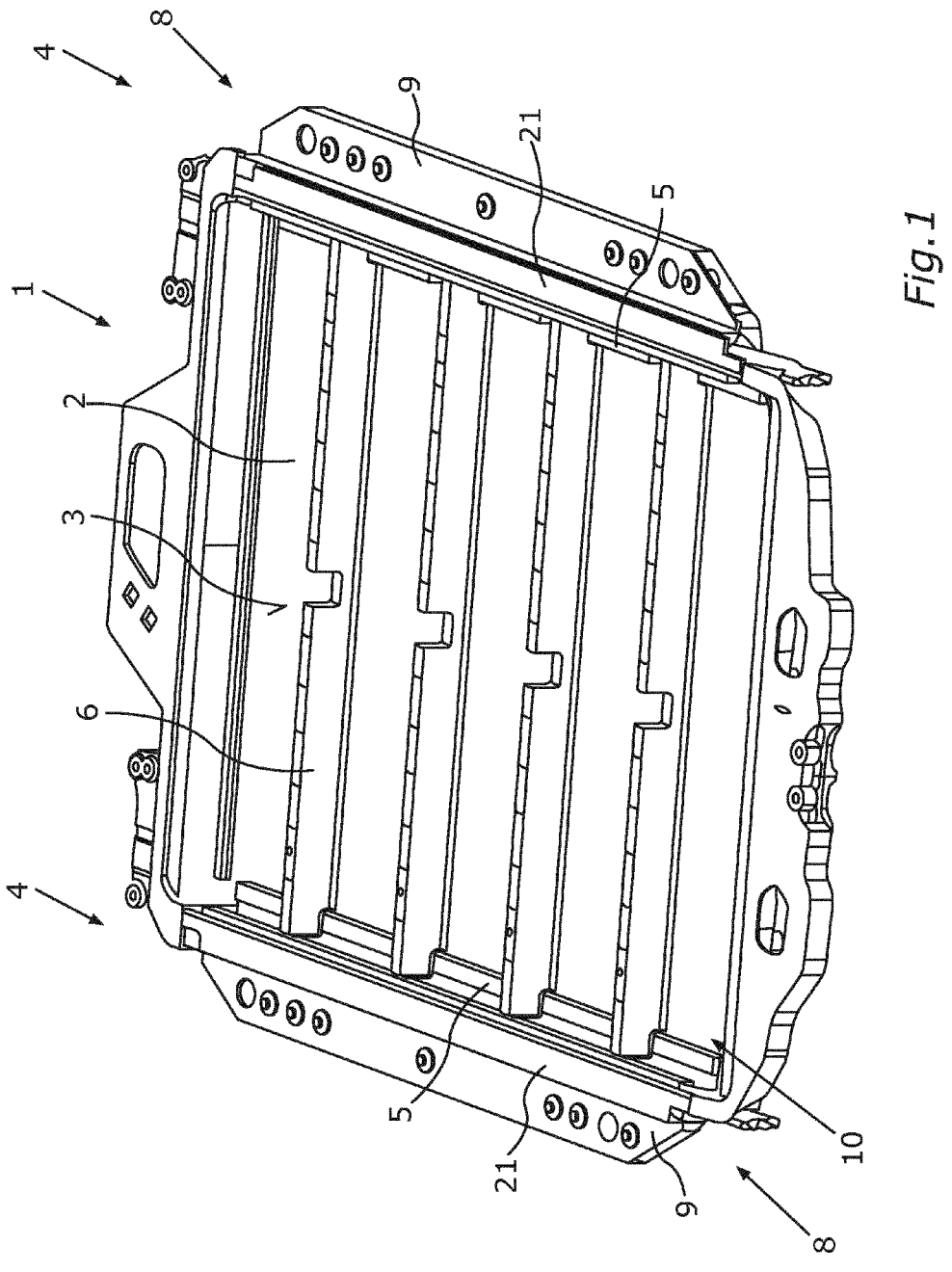
FIG. 1 is a perspective view of a housing lower part of a storage housing for an energy store of a passenger car having respective longitudinal members which extend on both vehicle sides of the storage housing.

FIG. 1 shows a perspective view of a housing lower part 2 of a storage housing 1 for an energy store, not shown any further, in the form of a high-voltage battery of a passenger car, which housing lower part 2 can be connected, for example, to a one-part housing upper part, not illustrated here, with the interposition of a seal in order to form the complete storage housing 1. Both the housing lower part 2 and the housing upper part can be formed from one piece or several pieces here. In the present case, the housing lower part 2 has an at least largely flat bottom 3, from which a respective edge 5 projects or is bent upward in the vehicle vertical direction on respective vehicle outer sides 4 of the storage housing 1. In the present case, the edge 5 is of encircling form, so that a trough-like housing lower part 2 is formed overall, several crossmembers 6 extending perpendicularly to the respective edge, which runs in the vehicle longitudinal direction, in the vehicle transverse direction within the trough-like housing lower part—in the installation position of the storage housing 1.

Figure 2:
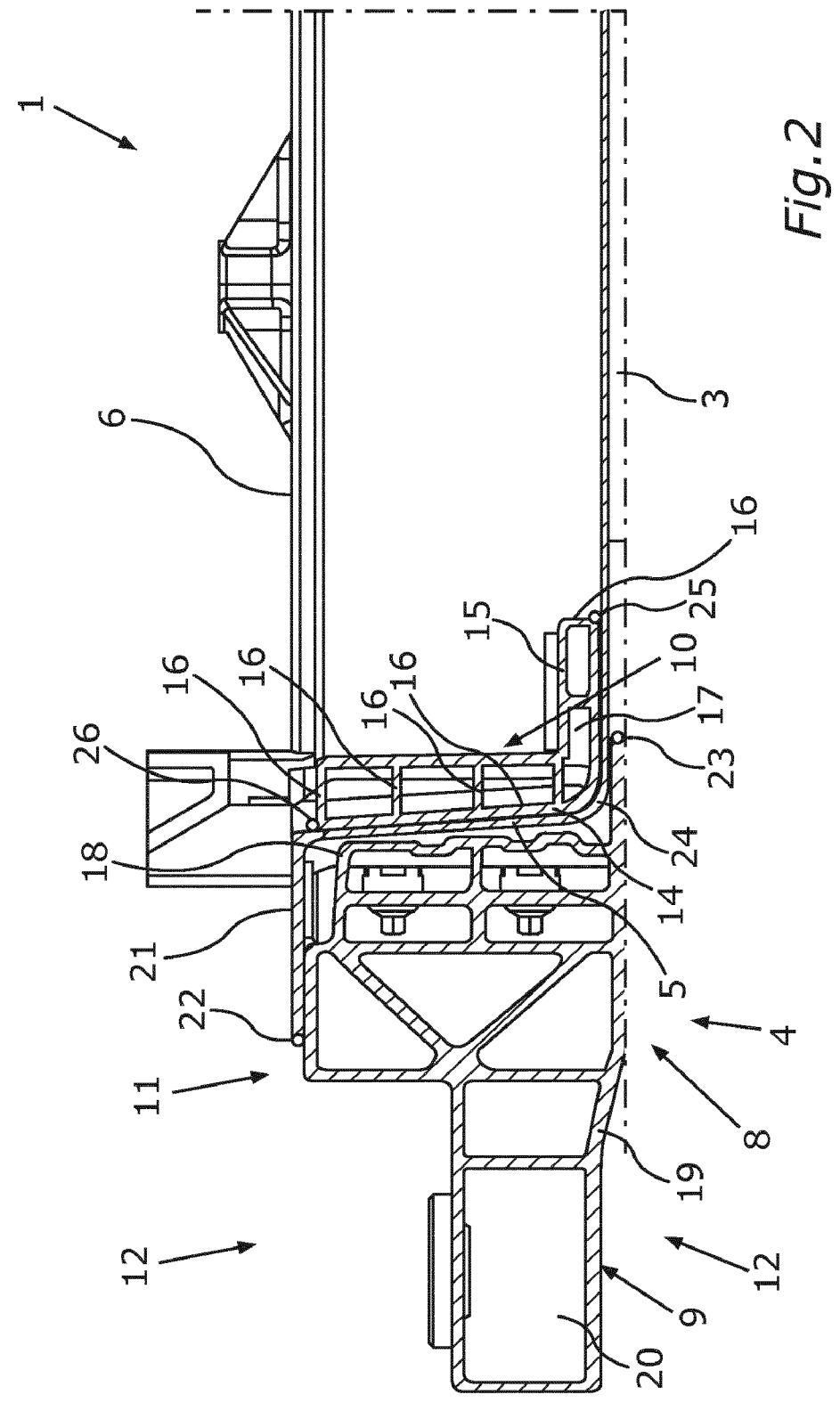
FIG. 2 is an enlarged sectional view through a detail of the arrangement of one of the two longitudinal members along the corresponding vehicle side of the housing lower part of the storage housing, the longitudinal member being formed from two partial longitudinal members, the partial cross sections of which complement one another to form an overall cross section.

A longitudinal member 8, a detail of which is shown as an enlarged sectional view in FIG. 2, is arranged along respective vehicle outer sides 7 of the storage housing 1, the vehicle outer sides accordingly extending in the vehicle longitudinal direction and approximately horizontally in the installation position on the motor vehicle. It is clear here that the respective longitudinal member 8 for each vehicle outer side of the storage housing 1 is formed from two partial longitudinal members 9, 10, the respective partial cross sections of which complement one another to form the overall cross section of the longitudinal member. The outer partial longitudinal member 9 is arranged on the outside of the corresponding edge 5 of the housing lower part 2 here and by way of a subregion 11 facing the edge 5 is adapted in its height to that of the edge 5. In contrast, an outer subregion 12 adjoining the outside of the inner subregion 11 is considerably reduced in terms of height and has respective connecting sleeves 13 by means of which the storage housing 1, after being completed and closed in a gastight manner in an underfloor arrangement, can be fastened to the associated side sill of the motor vehicle by means of respective screwing operations.

The second, inner partial longitudinal member 10, which is supplemented by the outer partial longitudinal member 9 to form the overall longitudinal member 8, is arranged on the inside of the edge 5 and therefore within the storage housing 1. Here, the inner partial longitudinal member 10 substantially has an L-shaped cross section and is supported firstly on the edge 5 and secondly on the bottom 3 of the housing lower part 2 of the storage housing 1. Here, the inner partial longitudinal member 10 has a chamber profile with an outer chamber wall 14 and an inner chamber wall 15, between which chamber walls respective, rib-like chamber walls 16 extend so as to form respective hollow chambers 17. In the present case, the partial longitudinal member 10 and the partial longitudinal member 9 are formed from an extruded metal profile, in particular composed of a metal alloy and in particular of an aluminum alloy. In the present case, the housing lower part 2 is formed, for example, as a sheet-metal molding, likewise composed of aluminum.

It is clear that the extruded profiles can also be produced as different kinds of continuous profiles or as rolled profiles, for example composed of plastic or steel or of another material. As an alternative to an aluminum alloy, the housing lower part 2 can also be produced, for example, from a steel alloy or a plastic, in particular a fiber-reinforced plastic.

The outer partial longitudinal member 9 has, in the inner subregion 11, a chamber wall 18, here of meandering or wave-like cross section, which adjoins the edge 5 of the storage housing 1 from the outside. This chamber wall 18 forms a sandwich-like, three-layer assembly with the edge 5 of the housing lower part 2 and the outer chamber wall 14 of the inner partial longitudinal member 10, the respective chamber walls each having a wall thickness of, for example, approximately 2 to 3 millimeters and the edge 5 of the housing lower part 2 having the same, so that an assembly with a material thickness of approximately 7 to 10 millimeters is provided overall. Owing to this assembly, the storage housing 1 is protected against intrusions in a particularly stable manner in the critical region, specifically in the region of the edge 5.

The other chamber walls 19 of the outer partial longitudinal member 9 are predominantly formed with the same material thickness. This also applies to the chamber walls 14 to 16 of the inner partial longitudinal member 10. However, it would also be conceivable to form, in particular, the chamber walls of the inner partial longitudinal member 10 with a greater material thickness than those of the outer partial longitudinal member 9. Furthermore, it can be seen in FIG. 2 that respective hollow chambers 20 of the outer partial longitudinal member 9 are formed with a much larger cross section than the hollow chambers 17 of the chamber profile of the inner partial longitudinal member 10. This results, amongst other things, in the desired setting of the stiffness or the energy absorption capacity of the overall longitudinal member 8, which is intended to be correspondingly softer in the outer region, that is to say in the region of the partial longitudinal member 9, and correspondingly harder in the region of the inner partial longitudinal member 10—or in other words which is intended to have a lower energy absorption capacity in the outer region than in the inner region close to the store.

Since, in the present case, the chamber walls 18, 19 of the outer partial longitudinal member 9 and also the chamber walls 14 to 16 of the inner partial longitudinal member 10 each have at least substantially the same material thickness, respective partial longitudinal members 9, 10, which can be produced in a particularly simple manner, result overall. This applies all the more so on account of the fact that the outer partial longitudinal member 9 has approximately hollow chambers 20 of a uniform cross-sectional size and the inner partial longitudinal member 10 likewise has hollow chambers 17 of a uniform cross-sectional size.

In the present region, the outer partial longitudinal member 9 is connected to a flange 21, which is bent away from the edge 5 at the top side, by means of a continuous weld seam, other welding or joining methods also being conceivable here. A further weld seam 23 between the outer partial longitudinal member 9 and the housing lower part 2 is provided in the region of the bottom, the outer partial longitudinal member 9 having, for this purpose, a lower chamber wall 24 projecting inward in relation to the inner chamber wall 18. The inner partial longitudinal member 10 is connected to the housing lower part 2 by means of respective weld seams 25 and 26, other welding or joining methods also being conceivable here. Mechanical connection of the outer and the inner partial longitudinal member

9, 10 by means of screw connections, for example, would also be conceivable if appropriate.

LIST OF REFERENCE SIGNS

1 Storage housing
2 Housing lower part
3 Bottom
4 Vehicle outer side
5 Edge
6 Crossmember
8 Longitudinal member
9 Partial longitudinal member
10 Partial longitudinal member
11 Subregion
12 Subregion
13 Connecting sleeves
14 Chamber wall
15 Chamber wall
16 Chamber wall
17 Hollow chamber
18 Chamber wall
19 Chamber wall
20 Hollow chamber
21 Flange
22 Weld seam
23 Weld seam
24 Chamber wall
25 Weld seam
26 Weld seam

The invention claimed is:

1. A storage housing for an energy store of a motor vehicle, comprising:
   at least one housing part of the storage housing; and
   a respective longitudinal member arranged along the at least one housing part on each of two vehicle outer sides of the storage housing, wherein
   the longitudinal members on the two vehicle outer sides of the storage housing are each formed from at least two partial longitudinal members, each partial longitudinal member being separate from the housing part and being in the form of a chamber profile with enclosed hollow chambers delimited by chamber walls, partial cross sections of the two partial longitudinal members having a substantially equal height so to complement one another to form an overall cross section of the longitudinal member.

2. The storage housing according to claim 1, wherein
   the at least one housing part has an edge on the two vehicle outer sides of the storage housing, and
   the edge is arranged laterally between the two partial longitudinal members of the corresponding longitudinal member.

3. The storage housing according to claim 2, wherein
   the at least one housing part is in the form of a housing lower part and the edge is bent upward in relation to a bottom of the housing lower part.

4. The storage housing according to claim 2, wherein
   an inner chamber wall of a respective outer partial longitudinal member, the edge of the housing part, and an outer chamber wall of a respective inner partial longitudinal member, form a three-layer assembly.

5. The storage housing according to claim 2, wherein
   the chamber walls of a respective outer partial longitudinal member and/or of a respective inner partial longitudinal member have at least substantially identical wall thicknesses.

6. The storage housing according to claim 3, wherein a respective inner partial longitudinal member is connected to the bottom of the housing lower part.

7. The storage housing according to claim 6, wherein the respective inner partial longitudinal member has a substantially L-shaped cross section.

8. The storage housing according to claim 2, wherein the chamber walls of a respective outer partial longitudinal member and of a respective inner partial longitudinal member are connected to one another with an interposition of the edge.

9. The storage housing according to claim 1, wherein the hollow chambers of a respective inner partial longitudinal member have a smaller cross section than the hollow chambers of a respective outer partial longitudinal member.

10. The storage housing according to claim 1, wherein the partial longitudinal members are formed from a continuous profile.

11. The storage housing according to claim 10, wherein the continuous profile is an extruded profile.

12. The storage housing according to claim 1, wherein the chamber walls of a respective outer partial longitudinal member have a lesser thickness than the chamber walls of a respective inner longitudinal member, which together form the respective longitudinal member.

\* \* \* \* \*